O. JUNGGREN.
AUTOMATIC BRAKE FOR ELASTIC FLUID TURBINES.
APPLICATION FILED AUG. 7, 1903.

910,388.

Patented Jan. 19, 1909.

3 SHEETS—SHEET 1.

Witnesses:
Marcus L. Byng.
J. P. Whitney

Inventor:
Oscar Junggren,
by Albert G. Davis
Att'y.

O. JUNGGREN.
AUTOMATIC BRAKE FOR ELASTIC FLUID TURBINES.
APPLICATION FILED AUG. 7, 1903.

910,388.

Patented Jan. 19, 1909.

3 SHEETS—SHEET 3.

Witnesses:
Marcus L. Byng.

Inventor:
Oscar Junggren,
by Albert G. Davis
Att'y.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

AUTOMATIC BRAKE FOR ELASTIC-FLUID TURBINES.

No. 910,388.     Specification of Letters Patent.     Patented Jan. 19, 1909.

Application filed August 7, 1903. Serial No. 168,592.

*To all whom it may concern:*

Be it known that I, OSCAR JUNGGREN, a citizen of the United States, residing at Schenectady, in the county of Schenectady, State of New York, have invented certain new and useful Improvements in Automatic Brakes for Elastic-Fluid Turbines, of which the following is a specification.

This invention relates to elastic fluid turbines and especially to those in which the rotating shaft is upright and is supported upon a step-bearing in which the bearing surfaces are separated by a thin film of oil or other lubricant forced in under heavy pressure. As the weight on these step-bearings is considerable, amounting sometimes to sixty or seventy tons, it is absolutely necessary that the pressure of the oil supply system should not fall below a certain predetermined minimum, while the machine is running. If, for any reason, such as a break-down of the lubricant pump or a choking of the lubricant pipe, the pressure should fall and allow the bearing surfaces to come in contact, they would quickly grind themselves to pieces even if steam were shut off promptly, since the momentum of the rotating parts is sufficient to keep them moving long enough to ruin the bearing after the steam is shut off.

The object of my invention, therefore, is to promptly check the rotation of the shaft and its attached parts in case the lubricant-pressure falls below a predetermined safe minimum.

To this end my invention consists in a brake for the rotating shaft, normally kept in an inoperative position by means of the lubricant-pressure supplied to the step-bearing, the construction and arrangement being such that upon failure of this pressure the brake will be immediately applied and the shaft will be quickly stopped.

Figure 1:
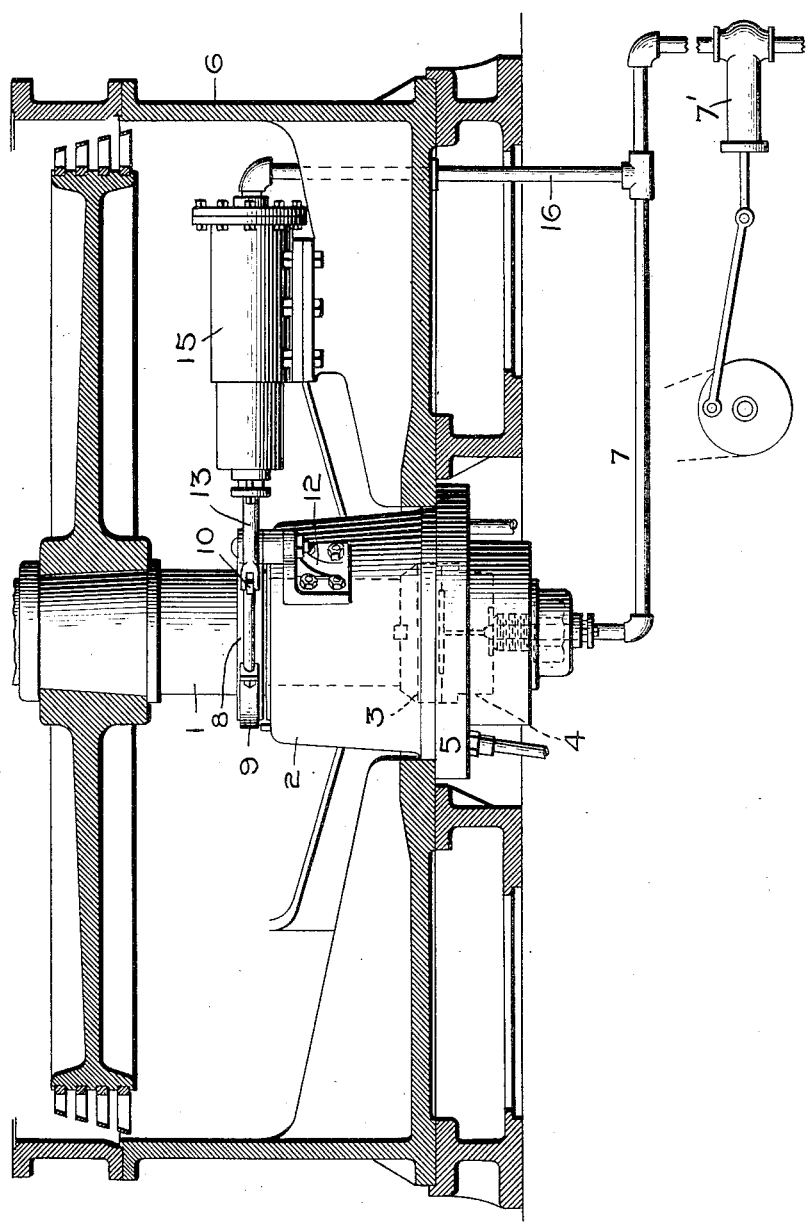
Figure 2:
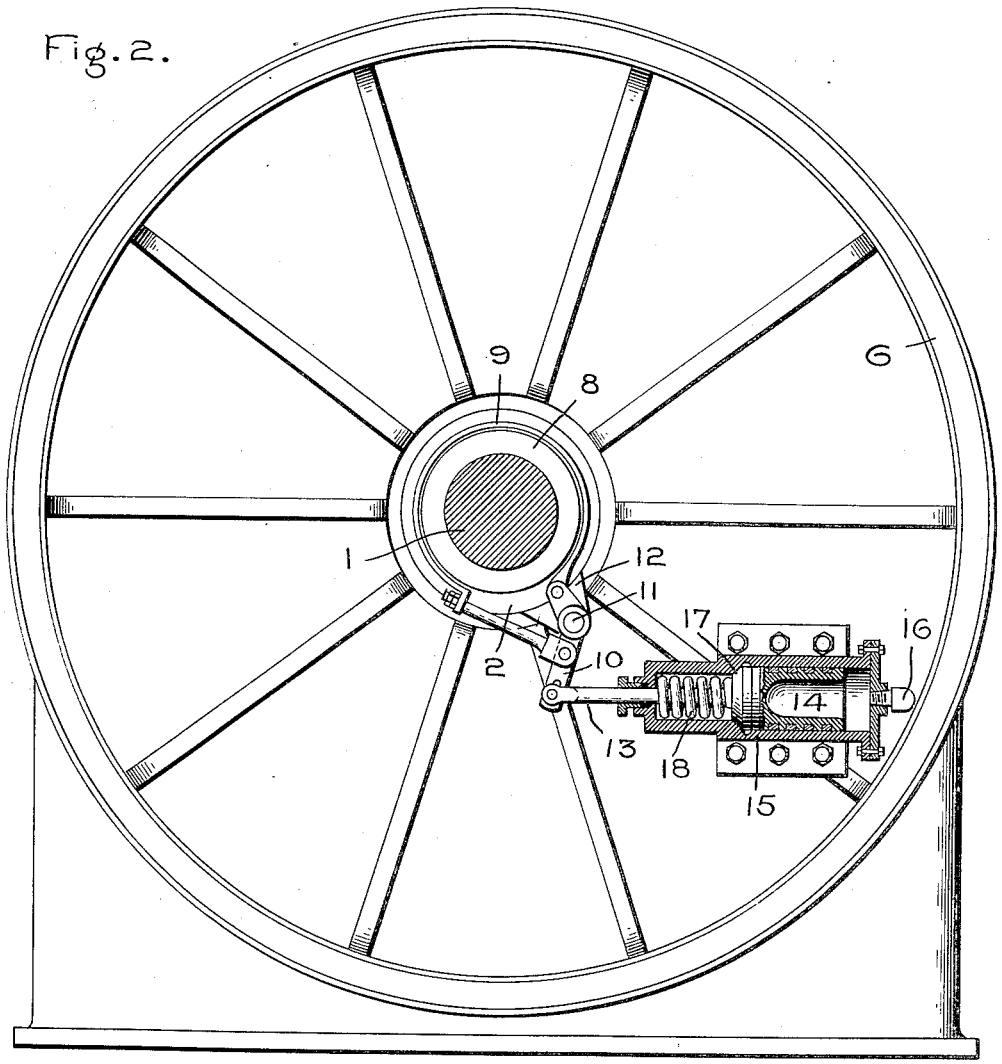
Figure 3:
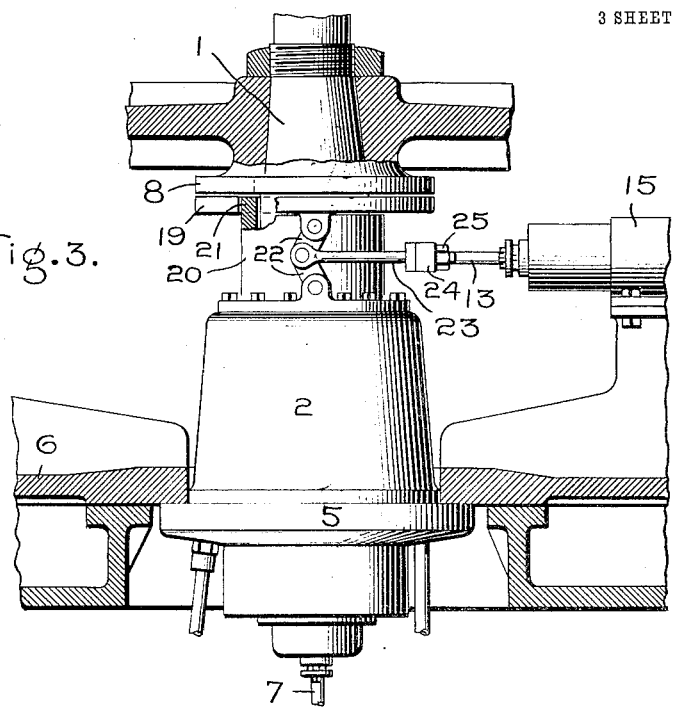
Figure 4:
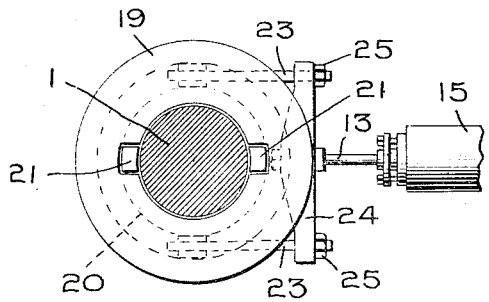

In the accompanying drawings Figure 1 is a vertical section of the lower portion of a steam turbine showing my invention applied thereto; Fig. 2 is a top plan view of the same partly in section; Fig. 3 is a side elevation showing a modification; and Fig. 4 is a top plan view of the same.

Referring to Figs. 1 and 2, the shaft 1 is supported in a step bearing contained in a shell or casing 2 and comprising a rotating bearing block 3 secured to the end of the shaft, and a stationary bearing block 4 located in a seat in the plate 5 which is secured to the casing 6 of the machine. Formed partly in the lower block and partly in the upper block, which is attached to the main shaft, is a chamber which receives fluid lubricant under pressure, preferably oil. The pressure in this chamber varies with the weight of the moving parts. In certain instances it is as high as fifteen hundred pounds per square inch, and this pressure is sufficient to support the weight of the rotating shaft and the parts attached thereto, a thin film of lubricant being constantly maintained between the adjacent surfaces of the bearing blocks when the machine is in operation. The lubricant is conveyed to the chamber by a pipe 7 which leads from a suitable source of supply, such as a force-pump, 7'. The details of construction of this bearing are fully set forth in a pending application of William L. R. Emmet and myself, filed June 25, 1903, Serial No. 163,060 which issued as Patent No. 874,947 on Dec. 31, 1907.

Secured to the shaft 1, and rotating therewith, is a collar 8. A flexible brake band 9 encircles the collar 8 and is attached at each end to a lever 10 pivoted at a point 11, between the ends of the brake band, on a bracket 12, secured to the side of the shell 2. One end of the lever is pivotally connected to a rod 13 which is rigidly attached to a movable abutment, such as a plunger 14 movable in a fixed cylinder 15 which is suitably mounted on the frame of the machine. The plunger has a long bearing in the cylinder and is provided with packing rings to make a tight joint. By means of a short branch pipe 16 leading from the oil pipe 7 the oil pressure is conveyed to the back end of the cylinder 15. In order to prevent any possible leakage of the oil past the plunger, the forward end of the plunger is conical in order to seat itself like a valve upon the conical internal shoulder 17 near the front end of the cylinder.

By means of the oil pressure on the abutment, the brake is maintained in an inoperative position, as shown in Fig. 2. Means are provided for applying the brake in case the pressure falls below a safe minimum; consisting preferably of a spring connected with the lever 10 and put under tension when the plunger is moved to its seat by the oil pressure. The spring is conveniently located between the abutment 14 on the rod 13 and a stationary support, such as the front end of the cylinder, in which case a helical spring 18 may be used.

The operation of the device is as follows: When the oil pressure falls below a predetermined minimum so that it is no longer able to maintain the bearing blocks 3 and 4 separated and also the plunger 14 in the position shown in Figs. 1 and 2, the tension of the spring will force the plunger backward and move the lever 10 in such a way as to apply the brake band 9 to the collar 8 and thus quickly check the rotation of the shaft and stop it despite the fact that power or the supply of steam to the turbine is not shut off. In order to obtain the best results it is necessary that the branch pipe 16 should lead from the pipe 7 at a point as near as possible to the step bearing. This insures a similarity of pressure in the bearing and cylinder and also minimizes the danger of failure to operate by a choking of the pipe 7 between the step bearing and the point at which the branch pipe leaves it.

In the modifications shown in Figs. 3 and 4, the movable brake element consists of the ring 19 loosely supported on the upper end of the sleeve 20 which encircles the shaft and is firmly bolted to the upper end of the shell 2. The ring is prevented from rotating with the shaft by means of lugs 21 which project upward from the sleeve 20 into openings in said ring. Between the ring and the lower flanged end of the sleeve is arranged a pair of toggles 22, preferably one on each side of the shaft. When the toggles are straightened out the ring will be lifted and forced into contact with the collar 8 on the shaft and thereby operate as a friction brake to stop the rotation of the shaft. The toggles are connected by rods 23 with a cross head 24 and the cross head in turn is attached to the end of the plunger rod 13. By means of nuts 25 the parts can be properly adjusted to give an equal upward pressure on both sides of the ring.

It will be seen that my invention provides a simple and efficient means for promptly checking the rotation of the shaft of an elastic fluid turbine whenever the pressure of the lubriant supplied to the step bearing falls below a predetermined safe minimum.

In the modifications shown in Figs. 3 and 4, the brake not only serves to stop the shaft but tends to lift it slightly so as to keep the bearing blocks separated and prevent them from exerting a destructive effect upon each other. Moreover, so long as the brake remains applied, the engine can not be started, so that there is no danger of accidentally injuring the step-bearing by starting the engine without proper oil pressure on the bearing.

In accordance with the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. The combination with a rotating shaft, of a bearing therefor comprising superposed blocks normally separated by a continuously flowing film of fluid under pressure, a device supplying fluid to maintain said film, an automatic brake for said shaft, and means responsive to changes in the fluid pressure supplied to said bearing for actuating said brake.

2. The combination with a rotating shaft, of a bearing therefor comprising superposed relatively rotatable blocks normally separated by a continuously flowing film of fluid under pressure, a device supplying fluid to maintain said film, a brake mechanism for the shaft, which is operated automatically to check the rotation of said shaft when the supply of lubricant to the bearing decreases beyond a predetermined limit, and means responsive to the pressure of the fluid supplied to the bearing for applying and releasing said brake.

3. A shaft, bearing blocks for supporting the shaft, and a device which under normal conditions causes a film of lubricant under pressure to flow between said blocks, in combination with a brake which when applied tends to move the shaft and relieve the pressure on the bearing blocks due to the weight of said shaft and its attached parts, and means responsive to the pressure of the lubricant supply which applies the brake when said pressure falls below normal.

4. The combination with a shaft and a bearing comprising a pair of relatively rotatable blocks, of means for normally maintaining a constantly flowing film of lubricant between the blocks, a device for preventing said shaft from being rotated when the supply of lubricant is below a predetermined limit, and means responsive to variations in said supply of lubricant for actuating said device.

5. The combination with a shaft and its bearing, of means for supplying said bearing with fluid under pressure, a brake adjacent the bearing for checking the rotation of the shaft which when applied tends to relieve said bearing of weight of the shaft and its attached parts, and means for automatically and positively actuating the brake when the supply of fluid to the bearing falls below a predetermined limit.

6. The combination with a shaft and a bearing located at one end of the shaft and comprising blocks normally separated by a continuously flowing film of lubricant, of means for supplying said bearing with fluid-lubricant under pressure, a brake for arresting the rotation of the shaft, a spring for applying said brake, and an abutment moved by said pressure and opposing the energy of said spring.

7. The combination with a shaft having a bearing comprising opposed blocks, one of which has an opening to receive fluid, of means for supplying said bearing with fluid-lubricant under pressure through said opening, a brake to arrest rotation of the shaft, a spring for applying said brake, a cylinder, a plunger in said cylinder connected with said brake, and a connection between said cylinder and the fluid lubricant supply.

8. The combination with a shaft having a bearing, of a pipe for supplying said bearing with fluid lubricant under pressure, a brake, a cylinder having a conical internal shoulder, a plunger having a conical face seated upon said shoulder, a spring between the plunger and the front end of the cylinder, a rod connecting the plunger with the brake, and a pipe connecting the back end of said cylinder with the lubricant supply pipe.

In witness whereof, I have hereunto set my hand this 5th day of August, 1903.

OSCAR JUNGGREN.

Witnesses:
BENJAMIN B. HULL,
HELEN ORFORD.